US012734501B2

(12) United States Patent
Kang et al.

(10) Patent No.: US 12,734,501 B2
(45) Date of Patent: Sep. 15, 2026

(54) MANUFACTURING METHOD OF CHEMICAL ADSORBENT FOR REMOVING HARMFUL GASES, AND APPARATUS THEREOF

(71) Applicant: GTScien Co., Ltd., Daejeon (KR)

(72) Inventors: Yeon Kyun Kang, Daejeon (KR); Moon Sam Suh, Daejeon (KR); Yoon Sang Yoo, Chungchengnam-do (KR)

(73) Assignee: GTScien Co., Ltd., Daejeon (KR)

( * ) Notice: Subject to any disclaimer, the term of this patent is extended or adjusted under 35 U.S.C. 154(b) by 486 days.

(21) Appl. No.: 18/226,281

(22) Filed: Jul. 26, 2023

(65) Prior Publication Data

US 2024/0316528 A1 Sep. 26, 2024

(30) Foreign Application Priority Data

Mar. 22, 2023 (KR) ........................ 10-2023-0037593

(51) Int. Cl.
*B01J 20/00* (2006.01)
*B01D 53/14* (2006.01)
(Continued)

(52) U.S. Cl.
CPC .......... *B01J 20/20* (2013.01); *B01D 53/1468* (2013.01); *B01D 53/1481* (2013.01);
(Continued)

(58) Field of Classification Search
CPC .. B01J 20/20; B01J 20/28014; B01J 20/3085; B01J 20/3204; B01D 53/1468; B01D 53/1481; B01D 2257/406
(Continued)

(56) References Cited

U.S. PATENT DOCUMENTS

| | | | |
|---|---|---|---|
| 4,855,276 | A | 8/1989 | Osborne et al. |
| 5,063,196 | A | 11/1991 | Doughty et al. |
| 2004/0089608 | A1 | 5/2004 | Vo |

FOREIGN PATENT DOCUMENTS

| | | |
|---|---|---|
| EP | 0873781 | 10/1998 |
| KR | 10-0374691 | 2/2002 |

(Continued)

OTHER PUBLICATIONS

Examination Report Under Sections 12 & 13 of the Patents Act, 1970 and the Patents Rules, 2003 Dated Mar. 30, 2026 From the Government of India, Intellectual Property India, Patents, Designs, Tade Marks, Geographical Indications, The Patent Office Re. Application No. 202334050028. (7 Pages).

*Primary Examiner* — James E McDonough

(57) ABSTRACT

The present invention relates to a method for manufacturing a chemical adsorbent for removing harmful gases, comprising a step of preparing an aqueous chemical solution, which is a mixture of 5 to 20 parts by weight of a chemical for a neutralization or oxidation-reduction reaction of harmful gases, and 120 to 150 parts by weight of purified water, relative to 100 parts by weight of a carrier as an adsorbent; an impregnation step of immersing the carrier in the aqueous chemical solution of a reaction tank and stirring at 50 to 100 rpm for 1 to 5 hr a resulting mixture obtained by immersing the carrier in the chemical aqueous solution while maintaining a temperature of the reaction tank at 60 to 95° C.; and a drying step of evaporating and removing moisture until a moisture content of the chemical adsorbent is 5 to 25% by stirring the resulting mixture at 100 to 300 rpm for 4 to 10 hr while maintaining the temperature of the reaction tank at 105 to 130° C., wherein the chemical adsorbent is obtained after stirring of the resulting mixture at 50 to 100 rpm for 1 to 5 hr is completed.

5 Claims, 4 Drawing Sheets

(51) Int. Cl.
*B01J 20/20* (2006.01)
*B01J 20/28* (2006.01)
*B01J 20/30* (2006.01)
*B01J 20/32* (2006.01)

(52) U.S. Cl.
CPC ..... *B01J 20/28014* (2013.01); *B01J 20/3085* (2013.01); *B01J 20/3204* (2013.01); *B01D 2257/406* (2013.01)

(58) Field of Classification Search
USPC .......................................................... 502/416
See application file for complete search history.

(56) References Cited

FOREIGN PATENT DOCUMENTS

| | | | | | |
|---|---|---|---|---|---|
| KR | 10-2006-0036866 | | | 5/2006 | |
| KR | 10-0993807 | | | 11/2010 | |
| KR | 100993807 | B1 | * | 11/2010 | .............. B01J 20/32 |
| KR | 10-2413214 | | | 6/2022 | |
| KR | 10-2022-0146938 | | | 11/2022 | |
| KR | 20220146938 | A | * | 11/2022 | .......... B01J 20/3078 |
| KR | 10-2472749 | | | 12/2022 | |

* cited by examiner

[Figure 1]
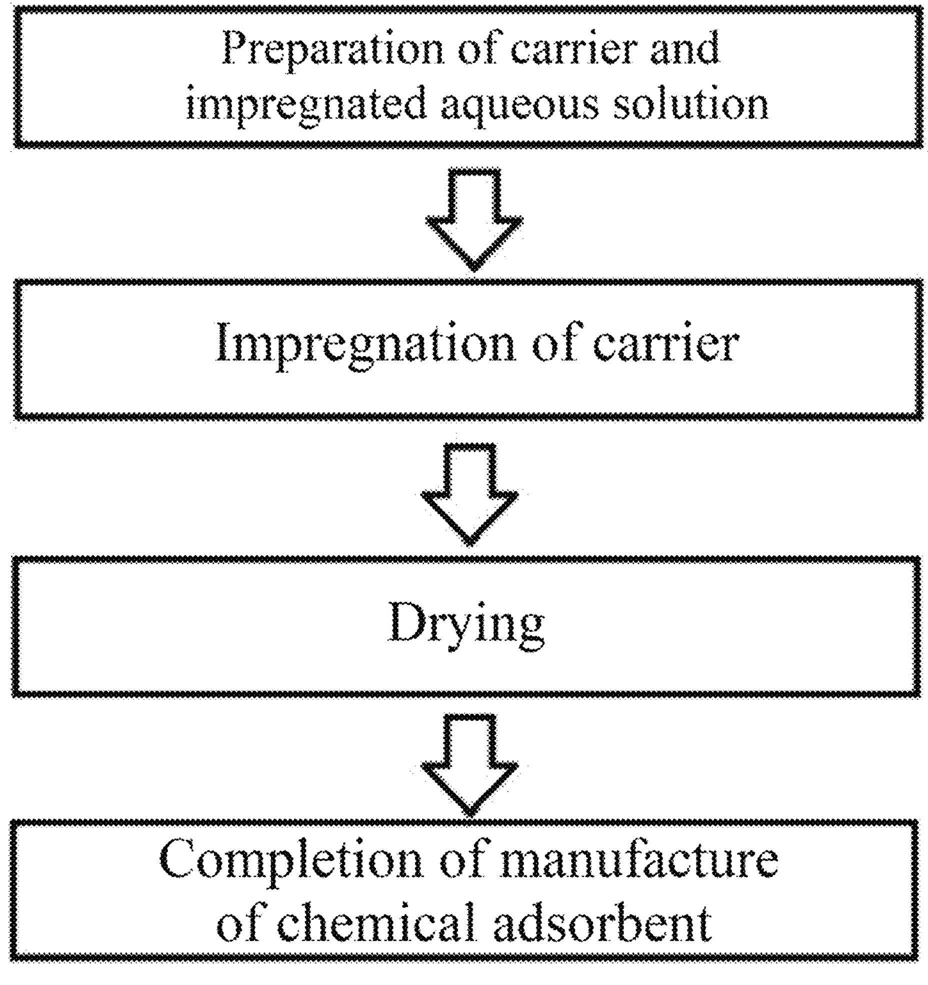

[Figure 2]
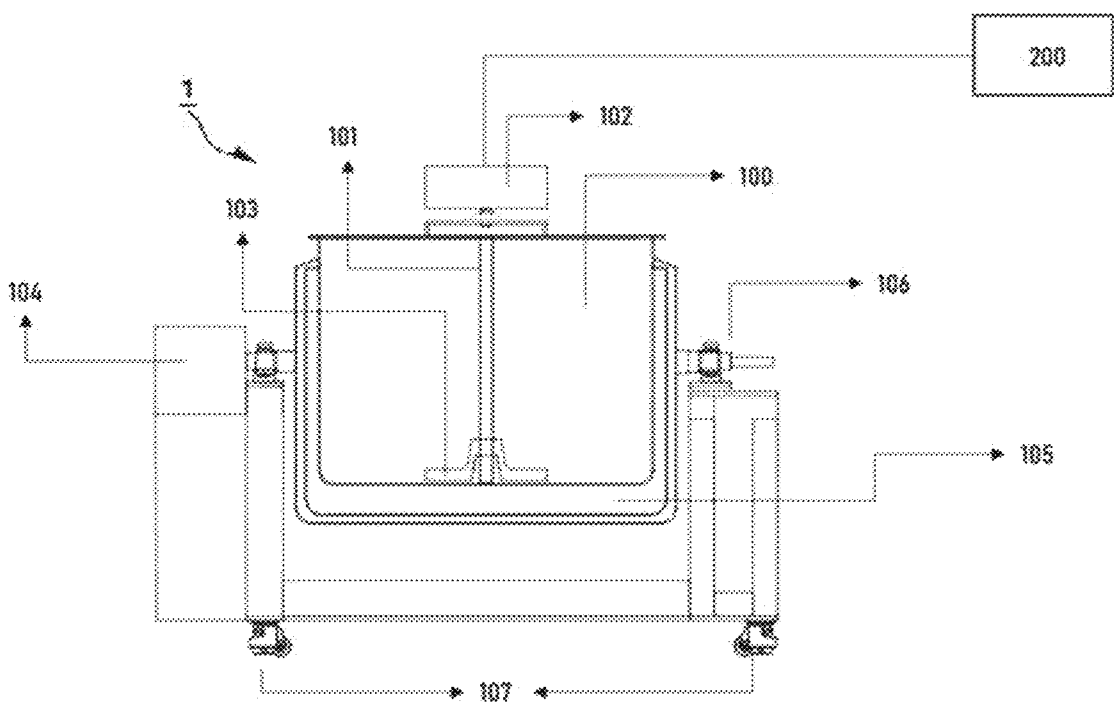

[Figure 3]
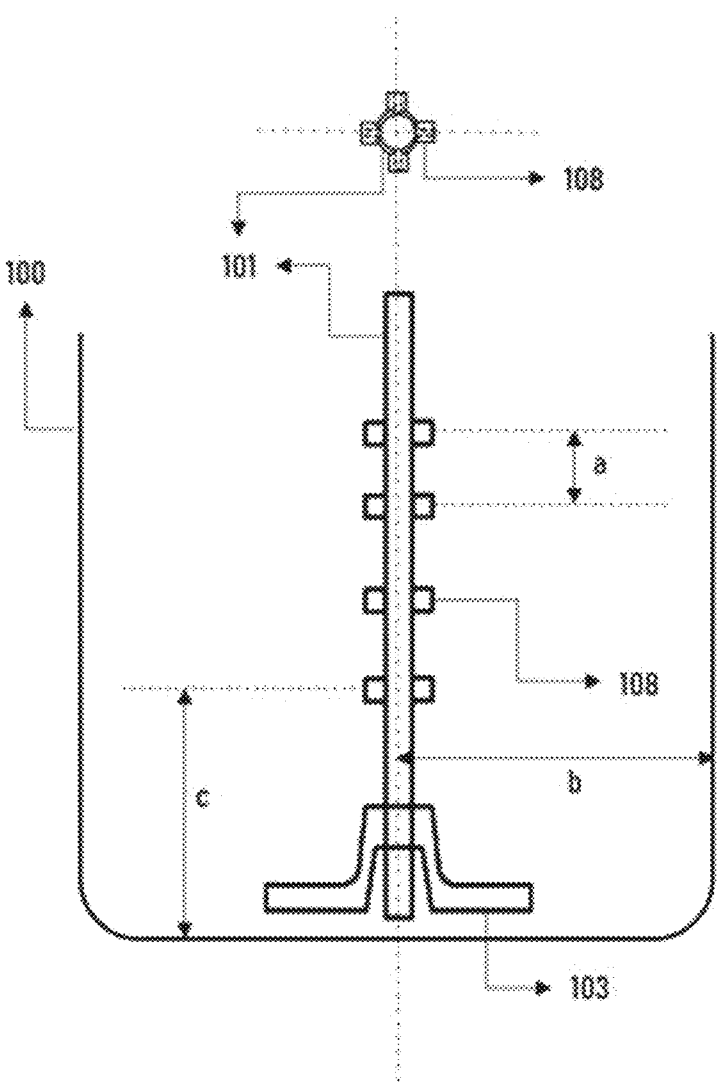

[Figure 4]
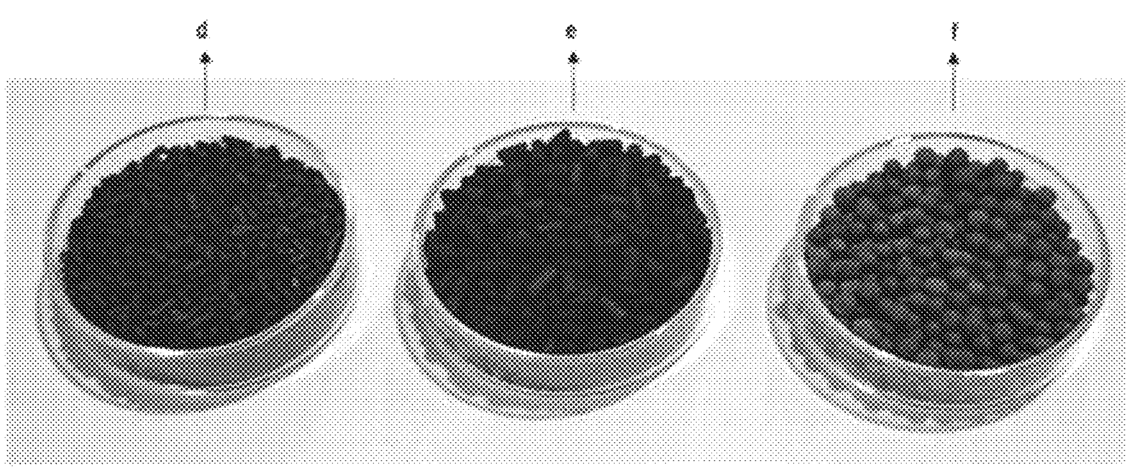

MANUFACTURING METHOD OF CHEMICAL ADSORBENT FOR REMOVING HARMFUL GASES, AND APPARATUS THEREOF

RELATED APPLICATION

This application claims the benefit of priority of Republic of Korea Patent Application No. 10-2023-0037593 filed on Mar. 22, 2023, the contents of which are incorporated by reference as if fully set forth herein in their entirety.

FIELD AND BACKGROUND OF THE INVENTION

The present invention relates to a method for manufacturing a chemical adsorbent for removing harmful gases and an apparatus thereof, and more particularly, relates to a method for manufacturing a chemical adsorbent applied to various types of cartridge filters for safely and effectively treating harmful chemical gases generated in research rooms, laboratories, or industrial sites, which is effective and efficient, and in particular, environmentally friendly without generating chemical wastewater, and a manufacturing apparatus that can effectively apply the same.

Conventionally, technologies of manufacturing chemical adsorbents by impregnating a carrier such as activated carbon, alumina, or zeolite with chemicals are widely known, but most of the commercially available technologies for manufacturing chemical adsorbents through impregnation have a problem of generating chemical wastewater to create secondary environmental pollutants.

The generated chemical wastewater must be treated according to the treatment method designated in accordance with the relevant laws and regulations, and in this process, additional chemicals are used, and accordingly, costs are incurred. In addition, there is a risk of secondary accidents due to leakage during the collection, storage, movement or transportation process of chemical wastewater.

In the event of such a chemical leakage accident, it causes damage to property and human life as well as environmental pollution, so that the development of methods and devices capable of minimizing environmental pollutants in the serial production of chemical adsorbents has been required in the industry.

In recent years, regulations related to the environment, such as the Occupational Safety and Health Act, the Clean Air Conservation Act, and the Water Environment Conservation Act, have been strengthened, and demands for harmful gas purification in laboratories as well as general industrial sites, such as the enactment of the Act on the Establishment of Safe Laboratory Environment and the implementation of the Serious Accidents Punishment Act, also trend to rapidly increase. As such demands for purifying harmful gases increase, the use of conventional adsorbents as well as the demand for high-performance and economical chemical adsorbents for removing harmful gases increases.

In general, according to methods in which an aqueous solution that a specific chemical is dissolved in water is impregnated and coated on active carbon, the manufacturing method of impregnated active carbon can be classified into a spray method that the chemical aqueous solution is sprayed onto the active carbon to impregnate the chemical, and then dried while flowing, an impregnation method that the active carbon is completely immersed and impregnated in the chemical aqueous solution, thereby drying, and a vapor method that the chemical is evaporated with heated air, thereby impregnating it to active carbon, and drying, and the like, where the spray method and the impregnation method are mainly used.

The spray method mainly uses a fluidized bed dryer, where the fluidized bed dryer performs an impregnation process for a certain time by injecting active carbon stored in an active carbon storage tank through an active carbon inlet to fill a certain amount of active carbon on the top of the dispersion plate inside the fluidized bed dryer, and then spraying the aqueous solution stored in a chemical aqueous solution storage tank on the active carbon through a chemical aqueous solution nozzle at the top of the fluidized bed dryer. After the predetermined impregnation time has elapsed, hot air heated by a hot air blower is supplied from the bottom of the fluidized bed dryer to dry the wet active carbon impregnated to the top of the spray plate, and compressed air is introduced during the drying process to prevent drifts.

However, this method sprays the aqueous solution from the top of the fluidized bed dryer to the active carbon stacked at a certain height on the upper part of the dispersion plate inside the fluidized bed dryer, so that the active carbon on the upper part contains a sufficient amount of chemical aqueous solution, but there is a risk that the active carbon on the lower part may not contain it, and thus, an appropriate amount of aqueous solution must be sprayed in order to uniformly include the chemical aqueous solution in the filled active carbon, where there is a problem that the control is very difficult because the amount of the chemical aqueous solution to be used is inevitably changed depending on the density of active carbon, moisture content, temperature, humidity, and the like.

That is, when the amount of the aqueous chemical solution to be used is small, there is a concern that it may not be evenly impregnated to the active carbon, and conversely, when the amount is large, the chemical aqueous solution flows down through several holes formed in the dispersion plate, whereby there is a problem that a treatment problem due to chemical wastewater treatment is caused.

Meanwhile, in the impregnation method, the active carbon is immersed in the chemical aqueous solution, impregnated, and then left for a certain time, whereby the chemical is impregnated to the active carbon, and then moved to a separate drying device and dried. This method has a disadvantage that the process efficiency is low because the impregnation process and the drying process are separated, and particularly, there is a serious problem that a large amount of chemical wastewater is generated in the drainage and dehydration processes after the impregnation process is finished. In addition, after the impregnation process, a separate drying process of implementing oven drying or fluidized bed drying by supplying or transporting hot air from the bottom of the reaction tank should be performed.

As a result, both the spray method and the impregnation method generate chemical wastewater, which are not sufficiently satisfactory in terms of environmental friendliness and worker safety, and have a common problem that the treatment of chemical wastewater inevitably requires cost and time.

In particular, when chemical adsorbents for removing harmful gases are industrially manufactured in large quantities, the impregnation method is mostly used, but the impregnation method inevitably generates a large amount of chemical wastewater containing excessive amounts of chemicals, whereby a process of transporting and treating the chemical wastewater is required, and in the process, and there is a concern about environmental safety accidents, as well as there is a problem that additional costs and efforts are consumed.

Also, in the vapor method of vaporizing chemicals using heated air to be impregnated to active carbon, a supersaturated steam generating device is required; it is not easy to control the amount of chemicals to be vaporized, so that the configuration of the device is very complicated; and there is a problem that it is concerned that air leakage of chemicals may occur due to a large amount of steam generated in a short period of time.

Conventional typical known techniques for producing chemical adsorbents include the following techniques.

Korean Registered Patent No. 10-0993807 (registered on Nov. 5, 2010) discloses a simple device with a small capacity for manufacturing impregnated active carbon configured so that impregnation and drying can be performed simultaneously in a cylindrical rotor reaction tank in order to solve the problems of conventional spray and impregnation methods at the same time, wherein for the supply of the impregnation liquid, the impregnation liquid is sprayed using one spray pipe disposed in the direction of the rotation axis, and the inflow pipe for drawing hot air heated by a heating device into the body and the outflow pipe for discharging are placed to prevent overheating upon drying.

However, the conventional technology is essentially by hot air drying, so that there is a problem that it requires a lot of energy cost for generating hot air, it is difficult to control a sufficiently impregnated amount of the impregnation liquid through the spray pipe, and it is not easy to achieve high capacity on an industrial scale.

Also, Korean Registered Patent No. 10-2413214 (registered on Jun. 21, 2022) discloses a chemical adsorbent for removing harmful gases, in which a phosphoric acid-derived compound is impregnated to active carbon as a carrier, a manufacturing method, and a filter comprising the same, but this is only specified by the type of impregnated material, which is essentially the same as the conventional impregnation method, so that there is a problem that the generation of chemical wastewater is inevitable.

In addition, Korean Registered Patent No. 10-0374691 (registered on Feb. 20, 2003) relates to a method for manufacturing a chemical adsorbent for removing hydrogen sulfide gas by simultaneously impregnating active carbon to a solution in which sodium hydroxide and diethanolamine are mixed in a certain ratio, but it is essentially the same as the conventional impregnation method except that the two materials are simultaneously impregnated, so that there is a problem that chemical wastewater is generated as well.

Furthermore, Korean Laid-Open Patent Publication No. 10-2022-0146938 (published on Nov. 2, 2022) suggests a manufacturing method comprising mixing a metal precursor solution with active carbon to impregnate the mixture, and a baking step after vacuum treatment and drying in the drying process, but it is not related to the present invention in that it comprises the baking step.

Meanwhile, Korean Registered Patent No. 10-2472749 (registered on Nov. 28, 2022) discloses a method for manufacturing an adsorption material, which contains harmful gas removal and antibacterial and deodorizing functions, and is a technology of mixing liquid raw materials and powder raw materials, and then formulating a chemical adsorbent with an extruder, which is completely unrelated to the chemical adsorbent proposed in the present invention.

SUMMARY OF THE INVENTION (Patent Document 001) Korean Registered Patent No. 10-0993807 (registered on Nov. 5, 2010)

(Patent Document 002) Korean Registered Patent No. 10-2413214 (registered on Jun. 21, 2022)

(Patent Document 003) Korean Registered Patent No. 10-0374691 (registered on Feb. 20, 2003)

(Patent Document 004) Korean Laid-Open Patent Publication No. 10-2022-0146938 (published on Nov. 2, 2022)

Therefore, it is a first object of the present invention to provide a method for manufacturing a chemical adsorbent for removing harmful gases, capable of manufacturing a chemical adsorbent applied to various types of cartridge filters for safely and effectively treating harmful chemical gases generated in research rooms, laboratories, or industrial sites in an environmentally friendly manner without generating chemical wastewater.

In impregnating an adsorbent with a chemical aqueous solution, it is a second object of the present invention to provide a method for manufacturing a chemical adsorbent for removing harmful gases, capable of efficiently and effectively performing impregnation and drying steps by a batch system without requiring any transfer in one device.

It is a third object of the present invention to provide a method for manufacturing a chemical adsorbent for removing harmful gases, in which the impregnation control is easy and simple by completely immersing the adsorbent in a chemical aqueous solution and then drying it, and the exposure of harmful factors to workers is reduced by minimizing the surplus usage of chemicals, whereby it is possible to contribute to the creation of a safety and health environment.

It is a fourth object of the present invention to provide an apparatus capable of smoothly and efficiently performing the manufacturing method according to all the objects as described above.

The first to third objects of the present invention as described above can be smoothly achieved by a method for manufacturing a chemical adsorbent for removing harmful gases, comprising a step of preparing an aqueous chemical solution, which is a mixture of 5 to 20 parts by weight of a chemical for a neutralization or oxidation-reduction reaction of harmful gases, and 120 to 150 parts by weight of purified water, relative to 100 parts by weight of a carrier as an adsorbent; an impregnation step of immersing the carrier in the aqueous chemical solution of a reaction tank and stirring at 50 to 100 rpm for 1 to 5 hr a resulting mixture obtained by immersing the carrier in the chemical aqueous solution while maintaining a temperature of the reaction tank at 60 to 95° C.; and a drying step of evaporating and removing moisture until a moisture content of the chemical adsorbent obtained after stirring of the resulting mixture at 50 to 100 rpm for 1 to 5 hr is completed is 5 to 25% by stirring the resulting mixture at 100 to 300 rpm for 4 to 10 hr while maintaining the temperature of the reaction tank at 105 to 130° C.

The fourth object of the present invention as described above can be smoothly achieved by an apparatus for manufacturing a chemical adsorbent for removing harmful gases comprising a reaction tank in which an oil jacket for heating is formed on the outside, an impeller located in the reaction tank and installed at the lower end of an agitation shaft in which a number of air nozzles are formed at predetermined intervals, and a motor and an air compressor connected to the agitation shaft, and for performing the above-described manufacturing method.

Effects of Invention

According to the method for manufacturing a chemical adsorbent for removing harmful gases in accordance with the present invention, and the apparatus thereof, the chemical adsorbent applied to various types of cartridge filters can be manufactured in an environmentally friendly manner without generating chemical wastewater; in impregnating chemicals to the adsorbent, the impregnation and drying steps can be efficiently and effectively performed in one device without transfer between processes and with high space availability; and the impregnation control is easy and simple by completely immersing the adsorbent in a chemical aqueous solution and then drying it, and the exposure of harmful factors to workers is reduced by minimizing the surplus usage of chemicals, whereby it is possible to contribute to the creation of a safety and health environment.

BRIEF DESCRIPTION OF THE SEVERAL VIEWS OF THE DRAWINGS

FIG. 1 is a manufacturing process view according to the present invention.

FIG. 2 is a schematic cross-sectional diagram of an apparatus according to the present invention.

FIG. 3 is a schematic diagram of a reaction tank portion in the apparatus of FIG. 2.

FIG. 4 is an exemplary view of a chemical adsorbent prepared according to the manufacturing method of the present invention.

DESCRIPTION OF SPECIFIC EMBODIMENTS OF THE INVENTION

Hereinafter, the present invention will be described in detail with reference to the accompanying drawings.

The following description should be understood as describing specific examples of the present invention, and the technical spirit of the present invention is not limited to the following description. In addition, the accompanying drawings are provided to aid understanding of the present invention, and the technical spirit of the present invention is not limited to the accompanying drawings.

The chemical adsorbent for removing harmful gases according to the manufacturing method of the present invention is a general-purpose chemical adsorbent capable of removing harmful gases, which may be generated from acidic or basic organic chemicals and inorganic chemicals, or any mixed chemicals thereof, by physical adsorption, and chemical reactions such as neutralization reactions or oxidation-reduction reactions.

The carrier in the chemical adsorbent according to the present invention is based on organic carriers obtained by carbonization and activation of coal-based, coconut-based, wood-based (pitch-based) and polymeric resin materials, and inorganic carriers such as alumina and zeolite, which may also be a mixture thereof.

In preparing the impregnated aqueous solution of the chemical adsorbent, the chemicals are selected from those that produce harmless substances through neutralization or oxidation-reduction reactions. For example, in the case of manufacturing a chemical adsorbent for removing hydrochloric acid (HCl) fumes, basic chemicals that react with hydrochloric acid to produce harmless salts are selected, which are typically sodium hydroxide (NaOH) or calcium hydroxide (KOH). The reaction during chemisorption is as follows.

$$HCl+KOH \rightarrow KCl+H_2O$$

Also, in the case of manufacturing a chemical adsorbent for removing ammonia ($NH_4$) fumes, which are representative of basic gases, typically, phosphoric acid ($H_3PO_4$) is most widely used, and the reaction during chemisorption is as follows.

$$3NH_4OH+H_3PO_4 \rightarrow (NH_4)_3 3PO_4+3H_2O$$

The impregnated aqueous solution is composed of a mixture of 120 to 150 parts by weight of purified water and 5 to 20 parts by weight of chemicals (reagents) relative to 100 parts by weight of the adsorption carrier.

The chemical aqueous solution used in the conventional wet impregnation method is composed of a mixture of 150 to 200 parts by weight of purified water and 10 to 50 parts by weight of chemicals (reagents) relative to 100 parts by weight of the adsorption carrier.

In the manufacturing method of the present invention, the reason why the usage of the applied chemicals is small compared to the conventional technology is because in the wet impregnation method according to the conventional technology, chemical wastewater occurs, and this chemical wastewater, in which the used chemicals are contained in excess, is discharged, whereas in the present invention, no chemicals are thrown away as the chemical wastewater, so that the usage of used chemicals is significantly reduced.

More specifically, when the chemical adsorbent is manufactured by the conventional wet impregnation method, 40 to 60 wt % of the impregnated aqueous solution as introduced is discharged as the chemical wastewater, and only 60 to 40 wt % is contained in the adsorption carrier and the moisture contained in the carrier is evaporated through the drying process.

The method for manufacturing a chemical adsorbent for removing harmful gases according to the present invention comprises the following steps, as shown in FIG. 1.

(A) Preparation Step:

A chemical aqueous solution consisting of a mixture of 5 to 20 parts by weight of a chemical for a neutralization or oxidation-reduction reaction of harmful gases, and 120 to 150 parts by weight of purified water is prepared, relative to 100 parts by weight of a carrier as an adsorbent.

(B) Impregnation Step:

The carrier is immersed in the chemical aqueous solution and the mixture is stirred at 50 to 100 rpm for 1 to 5 hr, while maintaining a reaction tank temperature at 60 to 95° C.

(C) Drying Step:

The moisture is evaporated and removed until a moisture content of the chemical adsorbent to which the chemical is impregnated is 5 to 25% by stirring the mixture at 100 to 300 rpm for 4 to 10 hr while maintaining the reaction tank temperature at 105 to 130° C.

Here, the used carrier as the adsorbent may be in the form of pellets, flakes, granules, or spheres having a diameter of 1 to 7 mm and a length of up to 7 mm, as shown in FIG. 4, and the carrier may be an organic, inorganic, or organic-inorganic mixed carrier.

Specifically, in FIG. 4, d is a pellet-type chemical adsorbent with a diameter of 2 mm (impregnated active carbon) for removing ammonia, e is a pellet-type chemical adsorbent with a diameter of 3 mm (impregnated active carbon) for removing sulfur dioxide, and f is a spherical chemical adsorbent with a diameter of 4 to 6 mm (impregnated alumina) for removing hydrogen sulfide.

Meanwhile, in the drying step, compressed dry air by an air compressor may be supplied at a pressure of 6 to 9 $kgf/cm^2$ through an agitation shaft, on which a number of air nozzles are formed, at the same time as the start or at the intermediate progress point when the half of the drying step is in progress.

In the manufacturing method according to the present invention, the temperature control of the reaction tank is performed by an oil jacket for heating, and the drying step is performed by injection of compressed dry air together with warming of the reaction tank.

The injected compressed air is in sufficient contact with the adsorbing carrier impregnated in the chemical aqueous solution by the rotation of the impeller, and then is discharged upward, and the exhaust air including some chemicals and a large amount of moisture is purified by suitable known filter means, and then finally discharged into the atmosphere.

The manufacturing method according to the present invention has high space utilization because the impregnation step and the drying step are performed as the batch system in the same reaction tank.

Meanwhile, the apparatus (1) according to the present invention for smoothly performing the manufacturing method according to the present invention as described above, comprises, as shown in FIGS. 2 and 3, a reaction tank (100) in which an oil jacket (105) for heating is formed on the outside, an impeller (103) located in the reaction tank (100) and installed at the lower end of an agitation shaft (101) in which a number of air nozzles (108) are formed at predetermined intervals, and a motor (102) and an air compressor (200) connected to the agitation shaft (101).

In the apparatus (1) according to the present invention, a rotating means (106) having a rotation shaft is installed so that the reaction tank (100) can be rotated and tilted by 90 degrees in the forward direction in order to discharge the chemical adsorbent upon completion of its manufacture.

The vertical distance between a number of air nozzles (108) formed on the agitation shaft (101) is 50 to 150 mm (a in FIG. 3), and the distance from the center of the agitation shaft (101) to the inner circumferential surface of the reaction tank (100) is 450 to 650 mm (b in FIG. 3), and the distance between the lowest nozzle (108) and the bottom surface of the reaction tank (100) is up to 300 mm (c in FIG. 3).

In addition, a plurality of air nozzles (108) may be formed in a cross shape, a radial shape, a triangular branch shape, or the like, at the same height of the agitation shaft (101).

In the drawings, the unexplained reference numeral 104 denotes a control board and the reference numeral 107 denotes movable casters.

Example 1: Manufacture of Chemical Adsorbent for Removing Ammonia Gas

Pellet-type active carbon with a diameter of 3 mm was used as a carrier for the chemical adsorbent, and a chemical aqueous solution consisting of a mixture of 150 parts by weight of purified water and 10 parts by weight of phosphoric acid (purity 85%—for food additives) as a chemical (reagent), relative to 100 parts by weight of the active carbon, was prepared.

After impregnating it for 4 hours under the conditions of a reaction temperature of 60° C. and an agitation speed of 50 rpm, it was dried for 8 hours under the conditions of a drying temperature of 105° C. and an agitation speed of 300 rpm, and after drying for 4 hours, dry air was supplied under a pressure of 7 kgf/cm$^2$ through an air nozzle-integrated agitation shaft.

The chemical adsorbent for removing ammonia gas thus manufactured was dried to have a moisture content of 15%, and manufactured.

Example 2: Manufacture of Chemical Adsorbent for Removing Ammonia Gas

Pellet-type active carbon with a diameter of 3 mm was used as a carrier for the chemical adsorbent, and a chemical aqueous solution consisting of a mixture of 150 parts by weight of purified water and 20 parts by weight of phosphoric acid (purity 85%—for food additives) as a chemical (reagent), relative to 100 parts by weight of the active carbon, was prepared.

After impregnating it for 4 hours under the conditions of a reaction temperature of 60° C. and an agitation speed of 50 rpm, it was dried for 8 hours under the conditions of a drying temperature of 105° C. and an agitation speed of 300 rpm, and after drying for 4 hours, dry air was supplied under a pressure of 7 kgf/cm$^2$ through an air nozzle-integrated agitation shaft.

The chemical adsorbent for removing ammonia gas thus manufactured was dried to have a moisture content of 15%, and manufactured.

Example 3: Manufacture of Chemical Adsorbent for Removing Sulfur Dioxide Gas Pellet-type active carbon with a diameter of 3 mm was used as a carrier for the chemical adsorbent, and a chemical aqueous solution consisting of a mixture of 150 parts by weight of purified water and 10 parts by weight of potassium hydroxide (purity 95%) as a chemical (reagent), relative to 100 parts by weight of the active carbon, was prepared.

After impregnating it for 4 hours under the conditions of a reaction temperature of 90° C. and an agitation speed of 50 rpm, it was dried for 8 hours under the conditions of a drying temperature of 105° C. and an agitation speed of 300 rpm, and after drying for 4 hours, dry air was supplied under a pressure of 7 kgf/cm$^2$ through an air nozzle-integrated agitation shaft.

The chemical adsorbent for removing sulfur dioxide gas thus manufactured was dried to have a moisture content of 15%, and manufactured.

Example 4: Manufacture of Chemical Adsorbent for Removing Hydrogen Sulfide Gas Spherical active alumina with a particle diameter of 4 to 6 mm was used as a carrier for the chemical adsorbent, and a chemical aqueous solution consisting of a mixture of 120 parts by weight of purified water and 10 parts by weight of potassium permanganate (purity 99 w/w %) as a chemical (reagent), relative to 100 parts by weight of the active carbon, was prepared.

After impregnating it for 2 hours under the conditions of a reaction temperature of 65° C. and an agitation speed of 50 rpm, it was dried for 6 hours under the conditions of a drying temperature of 120° C. and an agitation speed of 300 rpm, and after drying for 2 hours, dry air was supplied for 4 hours under a pressure of 7 kgf/cm$^2$ through an air nozzle-integrated agitation shaft.

The chemical adsorbent for removing hydrogen sulfide gas thus manufactured was dried to have a moisture content of 5%, and manufactured.

Comparative Example 1: Manufacture of Chemical Adsorbent for Removing Ammonia Gas According to the Conventional Impregnation Method Pellet-type active carbon with a diameter of 3 mm was used as a carrier for the chemical adsorbent, and a chemical aqueous solution consisting of a mixture of 200 parts by weight of purified water and 40 parts by weight of phosphoric acid (purity 85%—for food additives) as a chemical (reagent), relative to 100 parts by weight of the active carbon, was prepared.

After impregnating it for 4 hours at a reaction temperature of 25° C., it was dehydrated, and dried for 12 hours using hot air at a temperature of 105° C. to have a moisture content of 15 w/w %.

Comparative Example 2: Manufacture of Chemical Adsorbent for Removing Sulfur Dioxide Gas According to the Conventional Impregnation Method Pellet-type active carbon with a diameter of 3 mm was used as a carrier for the chemical adsorbent, and a chemical aqueous solution consisting of a mixture of 150 parts by weight of purified water and 20 parts by weight of potassium hydroxide (purity 95%) as a chemical (reagent), relative to 100 parts by weight of the active carbon, was prepared.

After impregnating it for 4 hours at a reaction temperature of 25° C., it was dehydrated, and dried for 12 hours using hot air at a temperature of 105° C. to have a moisture content of 15 w/w %.

Comparative Example 3: Manufacture of Chemical Adsorbent for Removing Hydrogen Sulfide Gas According to the Conventional Impregnation Method Active alumina having a particle size of 4 to 6 mm was used as a carrier for the chemical adsorbent, and a chemical aqueous solution consisting of a mixture of 150 parts by weight of purified water and 10 parts by weight of potassium permanganate (purity 99 w/w %) as a chemical (reagent), relative to 100 parts by weight of the active carbon, was prepared.

After impregnating it for 2 hours at a reaction temperature of 25° C., it was dehydrated, and dried for 8 hours using hot air at a temperature of 120° C. to have a moisture content of 5%.

Examples 1 to 4 according to the present invention were prepared without generation of chemical wastewater and the separate transfer process, as described above, and the conventional impregnation methods of Comparative Examples 1 to 3 generated chemical wastewater according to the separate dehydration process, and were based on the commercially available chemical adsorbent impregnation method.

Test Example 1: Harmful Gas Removal Ratio Per g of Chemical Adsorbent

Harmful gas removal ratios per g of the chemical adsorbents manufactured in Examples 1 to 4 and Comparative Examples 1 to 3 were measured, and the results are shown in Table 1 below.

TABLE 1

| | Test gas | Removal ratio per g (g/g) |
|---|---|---|
| Example 1 | Ammonia | 0.021 |
| Example 2 | Ammonia | 0.033 |
| Example 3 | Sulfur dioxide | 0.057 |
| Example 4 | Hydrogen sulfide | 0.001 |
| Comparative Example 1 | Ammonia | 0.020 |
| Comparative Example 2 | Sulfur dioxide | 0.043 |
| Comparative Example 3 | Hydrogen sulfide | 0.001 |

Referring to Table 1 above, in Example 1 of the chemical adsorbent for removing ammonia gas according to the present invention and Comparative Example 1 of the chemical adsorbent for removing ammonia gas according to the conventional impregnation method, the ammonia gas removal performance under the same test conditions did not show a significant difference within the experimental error range, and from Example 1 and Comparative Example 1, upon manufacturing the chemical adsorbent using the manufacturing method and manufacturing apparatus according to the present invention, the amount of chemicals introduced when preparing the impregnated aqueous solution could be reduced, and since there was no process movement and no wastewater generation, the process could be simplified, and the environmental impact properties could be reduced.

From Table 1 above, it could be seen from Examples 1 and 2 that the higher the concentration of the impregnated aqueous solution (the higher the usage of chemicals), the higher the ammonia harmful gas removal performance. In addition, from Example 2 and Comparative Example 1, it could be confirmed that even if the usages of chemicals were the same, the conventional impregnation method generated wastewater, and the chemical contained in the wastewater was discarded, whereby it was not used for the actual chemical adsorbent carrier, and discarded.

From Table 1 above, it could be confirmed from Example 3 and Comparative Example 2, and Example 4 and Comparative Example 3 that the present invention provided a manufacturing method and apparatus capable of having the same chemical adsorption force even if the usage of chemicals was reduced compared to the conventional impregnation method.

Then, it can be seen from the conventional patented technologies and the impregnated amounts of commercially available adsorbents that in the commercially available chemical adsorbents for removing ammonia, the maximum usage of the phosphoric acid chemical is used up to 70 wt % relative to the weight of the carrier, and the main products use an average of 40 wt %.

Various other chemical adsorbents, also, chemical adsorbents using the impregnation method in the chemical adsorbent manufacturing process, have high environmental impact properties due to the use of excessive amounts of chemicals and the generation of chemical wastewater, whereas the manufacturing method and manufacturing apparatus according to the present invention can minimize environmental impact properties.

Therefore, the excessive use of chemicals upon the manufacture of chemical adsorbents is due to the chemicals discarded as wastewater, which is a limitation of the conventional impregnation technology, and when the manufacturing method and manufacturing apparatus according to the present invention are used, it has been confirmed that even if smaller amounts of chemicals are used than the existing technology, it is possible to exhibit the required performance of currently commercially available chemical adsorbents.

Although the present invention has been described through examples, comparative examples, and test examples, those skilled in the art will be able to easily implement various changes and modifications without departing from the essential characteristics of the present invention. Therefore, the disclosed examples should be considered in terms of description rather than limitation, and the true scope of the present invention is shown in the claims rather than the foregoing description, and it will have to be interpreted that all differences within the scope equivalent thereto are included in the present invention.

EXPLANATION OF REFERENCE NUMERALS

| | |
|---|---|
| 1: chemical adsorbent manufacturing apparatus according to the present invention | |
| 100: reaction tank | |
| 101: agitation shaft (air injection-integrated type) | 102: motor |
| 103: impeller | 104: control board |
| 105: oil jacket | 106: rotating means |
| 107: movable caster | 108: air nozzle |
| 200: air compressor | |

The invention claimed is:

1. A method for manufacturing a chemical adsorbent for removing harmful gases comprising the following steps:
   (A) a step of preparing an aqueous chemical solution, which is a mixture of 5 to 20 parts by weight of a chemical for a neutralization or oxidation-reduction reaction of harmful gases, and 120 to 150 parts by weight of purified water, relative to 100 parts by weight of a carrier as an adsorbent;
   (B) an impregnation step of immersing the carrier in the aqueous chemical solution of a reaction tank and stirring at 50 to 100 rpm for 1 to 5 hr a resulting mixture obtained by immersing the carrier in the chemical aqueous solution while maintaining a temperature of the reaction tank at 60 to 95° C.; and
   (C) a drying step of evaporating and removing moisture until a moisture content of the chemical adsorbent is 5 to 25% by stirring the chemical adsorbent at 100 to 300 rpm for 4 to 10 hr while maintaining the temperature of the reaction tank at 105 to 130° C., wherein the chemical adsorbent is obtained after stirring of the resulting mixture at 50 to 100 rpm for 1 to 5 hr is completed.

2. The method for manufacturing a chemical adsorbent for removing harmful gases according to claim 1, wherein the adsorbent is an organic, inorganic, or organic-inorganic carrier in the form of pellets, flakes, granules, or spheres having a diameter of 1 to 7 mm and a length of up to 7 mm.

3. The method for manufacturing a chemical adsorbent for removing harmful gases according to claim 1, wherein dry air is supplied at a pressure of 6 to 9 kgf/cm$^2$ at the same time as the drying step or at the intermediate progress point of the drying step.

4. The method for manufacturing a chemical adsorbent for removing harmful gases according to claim 1, wherein the temperature control of the reaction tank is made by an oil jacket for heating surrounding the reaction tank.

5. The method for manufacturing a chemical adsorbent for removing harmful gases according to claim 1, wherein the impregnation step and the drying step are performed as a batch system in the same reaction tank.

* * * * *